United States Patent Office 3,337,007
Patented Aug. 22, 1967

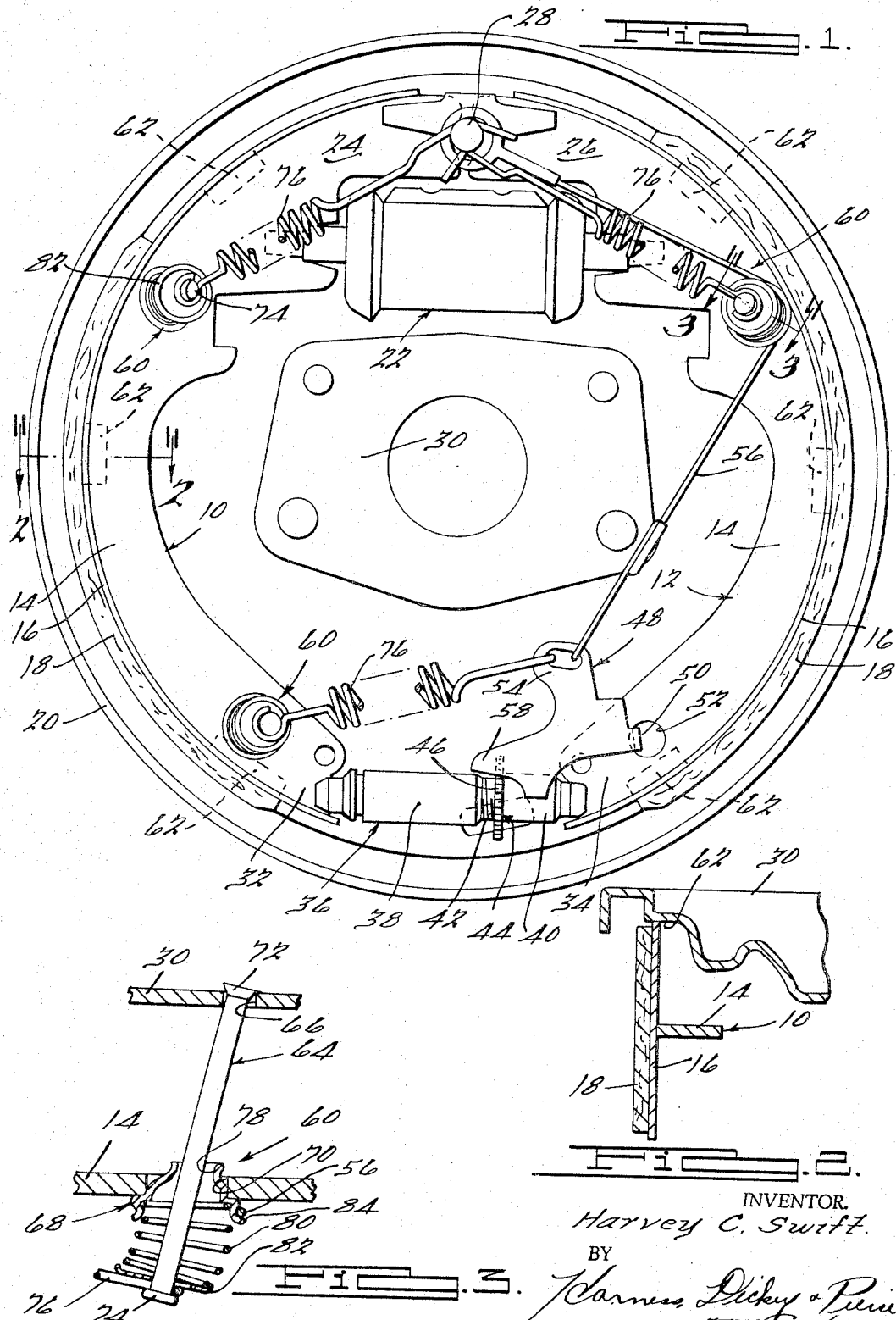

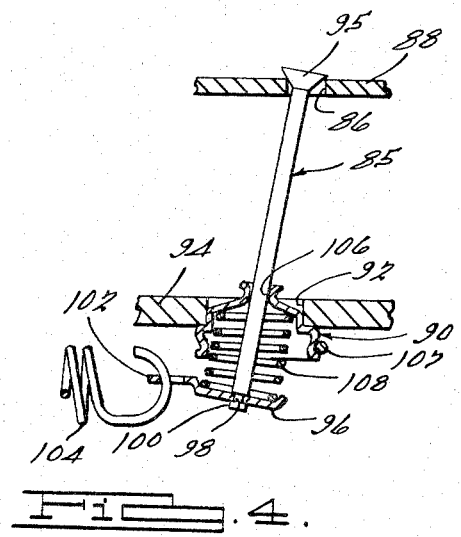
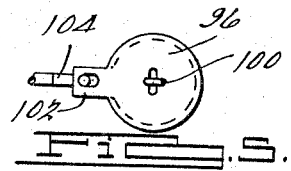
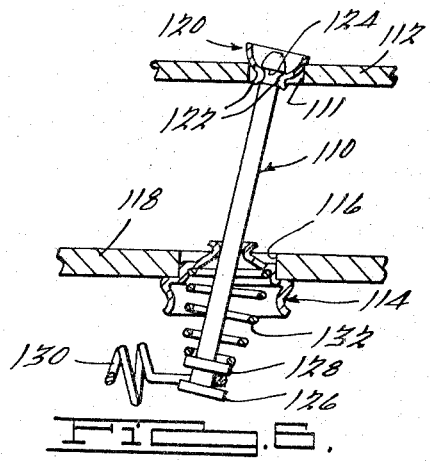
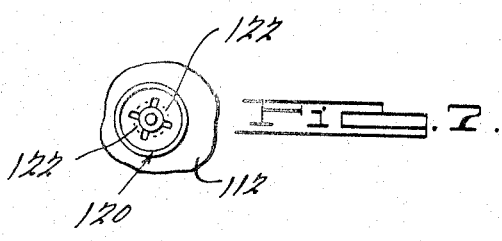
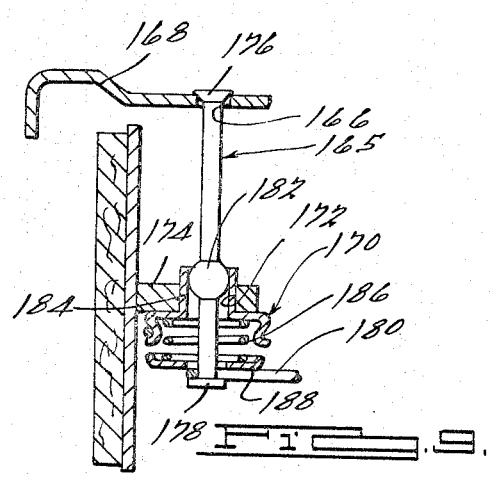
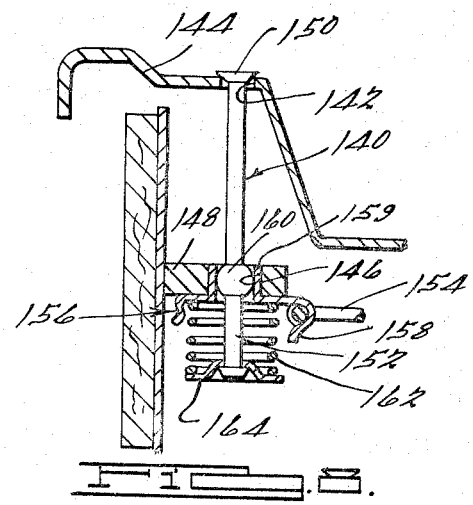

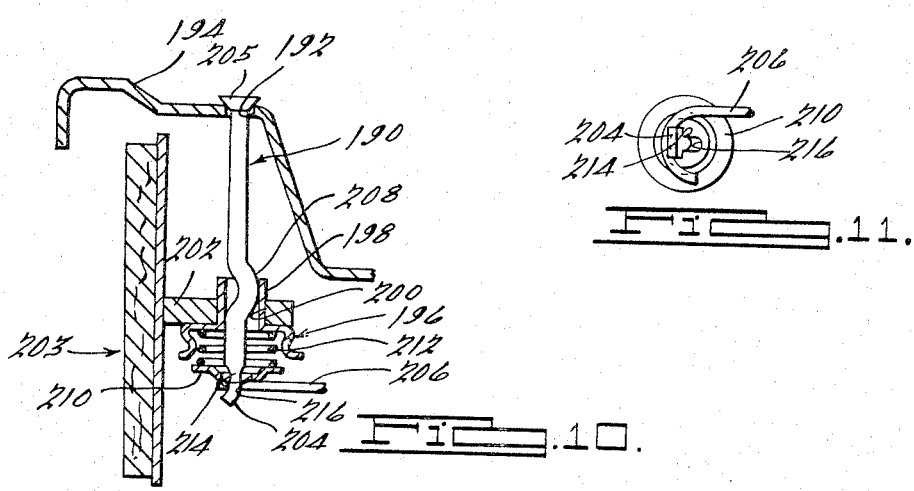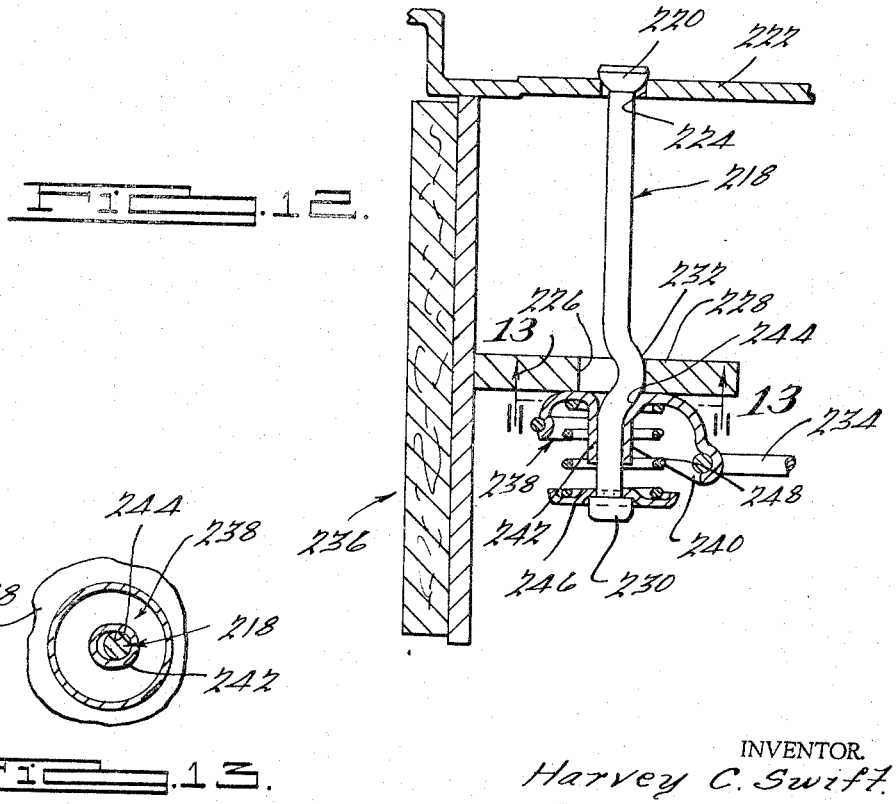

3,337,007
BRAKE SHOE RETAINER
Harvey C. Swift, Birmingham, Mich., assignor to Kelsey-Hayes Company, Romulus, Mich., a corporation of Delaware
Filed May 16, 1962, Ser. No. 195,111
11 Claims. (Cl. 188—78)

This invention relates to a brake assembly and more particularly to a brake assembly of the internal expanding shoe type.

Objects of the present invention are to provide a brake assembly of the internal expanding shoe type having improved means for holding brake shoes on a backing plate which conjointly act to prevent the brake shoes from hanging up or catching on a brake drum as they are retracted away from the brake drum upon release of braking pressure; and to provide such conjoint holding and retracting action by means including a brake shoe return lever having one end pivotally connected to the backing plate and an opposite end extending through an aperture in a brake web into engagement with one end of a first spring having its opposite end connected to fixed anchor means for retracting the brake shoe away from the brake drum upon release of braking pressure, and a second spring biased between said opposite end of the lever and the brake web for resiliently holding the brake shoe with respect to the backing plate.

Further objects of the present invention are to provide such brake shoe holding and retracting means including a cup-shaped tubular retainer secured on the brake web for supporting one end of the second spring; to provide such a retainer having a portion which engages the brake shoe return lever at a point offset from the centerline of the brake web for urging the brake shoe away from the backing plate when the brake shoe is in its retracted position; and to provide such a retainer having an outer surface portion which engages cable means to operatively associate an expansible end of the brake shoe with the adjuster element of an automatic brake adjustment assembly.

A further object of this invention is to provide an improved brake shoe retracting and holding assembly which is reliable, which is adapted to render service over a long, useful life without undue wear or destruction of parts, and which is inexpensively manufactured.

Further objects, features and advantages of this invention will become apparent from a consideration of the following description, the appended claims and the accompanying drawings in which:

FIGURE 1 is a view in side elevation of a brake assembly including brake shoe holding and retracting assemblies constructed in accordance with the principles of the present invention.

FIGURE 2 is a view in horizontal section taken along the line 2—2 of FIGURE 1;

FIGURE 3 is an enlarged view in section of a brake shoe retracting and holding assembly taken substantially along the line 3—3 of FIGURE 1;

FIGURE 4 is a view in section of another embodiment of the brake shoe retracting and holding assembly of the present invention;

FIGURE 5 is a view in front elevation of a retaining washer element of the assembly illustrated in FIGURE 4;

FIGURE 6 is a view in section of a further embodiment of the brake shoe retracting and holding assembly of the present invention;

FIGURE 7 is a fragmentary view in rear elevation of the assembly illustrated in FIGURE 6;

FIGURE 8 is a view in section of still another embodiment of the brake shoe retracting and holding assembly of the present invention;

FIGURE 9 is a view in section of yet another embodiment of the retracting and holding assembly of the present invention;

FIGURE 10 is a view in section of still another embodiment of the present invention;

FIGURE 11 is a view in front elevation of a retaining washer element of the assembly illustrated in FIGURE 10;

FIGURE 12 is a view in vertical section of still another embodiment of the present invention; and FIGURE 13 is a view in section taken along the line 13—13 of FIGURE 12.

Referring now to FIGURES 1–3 of the drawings, a representative brake assembly including one embodiment of the invention, is illustrated as having a pair of brake shoes 10 and 12 each of which includes a radially inwardly directed web 14, a rim 16 and friction lining 18. The shoes are applied against a rotatable brake drum 20 by means of a fluid motor 22 including a pair of oppositely acting pistons operatively connected to adjacent expansible ends 24, 26 of the brake shoes 10 and 12. The brake shoes 10, 12 are anchored by means of either of the adjacent expansible ends 24, 26, depending upon the direction of rotation of the drum 20, and a post 28 located therebetween which has one end fixedly secured to a backing plate 30.

Opposite ends 32, 34 of brake shoes 10, 12 are articulated with respect to a thrust link or strut 36 which comprises an adjusting nut 38 and a socket 40 which engage the articulated shoe ends 32, 34 respectively, and an externally threaded link 42 which threadably engages internal threads in the adjusting nut 38. The link 42 has a transversely located ratchet wheel 44 which is provided with serrations 46 around the outer periphery thereof.

The adjustable thrust link or strut 36 is automatically adjusted to take up lining wear by means including a one-piece adjuster element 48 which is pivotally connected to the brake shoe 12 by means of an end portion 50 bent through an aperture 52 defined in the web 14 of the brake shoe 12. An actuating end 54 of the adjuster element 48 connects to one end of a cable 56 which has its opposite end anchored on the post 28 by suitable fastening means. An intermediate portion of the cable 56 operatively connects to the expansible end 26 of the brake shoe 12 in a manner to be discussed, whereby expansion of the end 26 will pull the cable 56 in a direction which will pivot the element 48 about its end 50 to move an actuated end 58 of the adjuster 48 a predetermined distance corresponding to the wear of the brake linings 18. When the brake shoes 10, 12 are retracted, by means including a return spring connected between the actuating end 54 of the adjuster 48 and the outer end of a brake shoe return lever to be described, the actuated end 58 is urged into engagement with the serrations 46 in the ratchet wheel 44 to adjust the brake shoes 10, 12 outwardly and thereby compensate for brake lining wear.

The brake construction illustrated in FIGURES 1–3 further includes improved brake shoe retracting and holding assemblies 60 which locate the brake shoes 10, 12 with respect to a plurality of circumferentially spaced brake shoe guide shelves 62 in the backing plate 30. (See FIGS. 1 and 2.) In the illustrated brake, such assemblies coact with each end of the brake shoe 10 and the expansible end 26 of the brake shoe 12 to align the brake shoes 10, 12 laterally with respect to the backing plate 30 while retracting the brake shoes 10, 12 away from the rotatable brake drum 20.

In FIGURES 1 and 3, each of the retracting and holding assemblies 60 includes a brake return lever 64 which is directed outwardly of the backing plate 30 through an aperture 66 in the backing plate 30 and through a central opening defined in a generally conically shaped tubular washer or retainer element 68 which fits in an aperture 70 defined in the brake shoe web 14. The inner end portion 72 of the lever 64 has a generally hemispherical surface which pivotally engages the rear surface of the backing plate 30 adjacent the aperture 66. The outer end 74 of the brake return lever 64 is located outwardly of the retainer element 68 and the brake shoe web 14 where it is flattened to define a shoulder which engages one end of a brake shoe return spring 76 which has its opposite end connected to suitable anchor means. Spring return forces are transmitted to the web 14 by means of the lever 64 which bears against an inside surface 78 at the inner end of the retainer 68 which defines a convexly curved bearing surface which prevents galling of the lever 64 at the retainer 68 as the lever 64 pivots on the backing plate 30 to retract a brake shoe. The bearing surfaces 78 on the retainers 68 are located inwardly of the centerlines of the webs 14 so that forces applied thereon will tend to raise the brake shoes 10, 12 off their guide shelves 62 when the brake shoes 10, 12 are in their retracted position. Accordingly, the brake shoes will not catch on the shelves 62 when the fluid motor 22 moves the brake shoes 10, 12 radially outwardly into engagement with the rotatable drum 20.

By tending to raise the shoes 10, 12 from the shelves 62 it has been found that a lesser brake force is required to initially move the brake shoes 10, 12 into engagement with the rotatable drum 20. Furthermore, the braking action is smoother than in cases where the brake shoes engage the shelves 62 during the radially outward braking movement. Furthermore, the tendency for the shoes to be raised from the shelves 62 minimizes wear between the shoes 10, 12 and the shelves 62 which might otherwise tend to gall the surface of the shelves 62.

The brake shoes 10, 12 are held in lateral alignment with the rotatable drum 20 by means of a hold-down spring 80 having one end engaging the inner surface of the tubular conical washer 68 at the outer end thereof which defines a cup-like retainer for the spring 80. The opposite end of the spring 80 engages the inner surface of a dished washer 82 which is slidingly mounted on the lever 64 between the spring 80 and the end of the return spring 76. The hold-down spring 80 will thereby coact with the lever 64 to urge the webs 14 away from the washer 82 to maintain a desired lateral alignment between the brake shoes 10, 12 and the rotatable drum 20 without requiring additional hold-down assemblies located centrally of each brake shoe.

In the brake construction illustrated in FIGURES 1–3, the brake shoe retracting and holding assembly 60 located in the expansible end 26 of the shoe 12 also serves to operatively connect the expansible end 26 of the shoe 12 to the adjuster element 48 of the illustrated automatic brake adjusting system. More particularly, the actuating cable 56 of the adjusting system engages the outer surface 84 of the outer end of the tubular retainer 68 which is secured to the expansible end 26. Accordingly, when the expansible end 26 is moved away from the anchor post 28 the cable 56 will be moved therealong to force the adjuster element 48 in a direction to compensate for lining wear as previously discussed.

Another embodiment of the brake shoe retracting and holding assembly is illustrated in FIGURES 4 and 5 as comprising a brake shoe return lever 85 which is directed through an aperture 86 defined in a backing plate 88 and a central opening defined in a tubular, substantially conically shaped washer or retainer 90 which fits in an aperture 92 defined in a brake shoe web 94. One end 95 of the lever 85 has a substantially hemispherical surface which pivotally engages the rear surface of the backing plate 88 adjacent the aperture 86.

A radially inner edge defined by a central aperture in a dished washer 96 fits in a groove 98 which is located in the lever 85 at a point located outwardly of the retainer element 90 and the web 94. The washer 96 is fixedly secured to the lever 85 by swaging the outer end 100 of the lever 85 into engagement with the outer surface of the washer 96. A radially outwardly directed tab portion 102 of the washer 96 engages one end 104 of a brake shoe return spring which forces the lever 85 against an inwardly curved bearing surface 106 defined by the inner end of the tubular retainer 90 which acts to prevent galling of the lever 85. The curved bearing surface 106 is offset from the centerline of the shoe web 94 so that spring return forces transmitted to the shoe web 94 from the tubular retainer 90 will tend to raise a brake shoe away from supporting shelves as was discussed in the previous embodiment. Furthermore, the outer surface of the retainer 90 is adapted to be operatively connected with a cable element 107 of an automatic adjuster system.

In this arrangement, a brake shoe is held in lateral alignment with a rotatable brake drum by means of a hold-down spring 108 which surrounds the lever 85 and which has one end engaging the inner surface of the outer end of the tubular retainer 90 and its opposite end engaging the inner surface of the dished washer 96. The brake shoe web 94 is thereby urged away from the outer end 100 of the lever 85 to produce the desired lateral alignment.

A further embodiment of the invention is illustrated in FIGURES 6 and 7 as comprising a brake shoe return lever 110 which is directed through an aperture 111 in a backing plate 112 and a central opening defined in a tubular retainer element 114 which is identical to the tubular retainer 90 illustrated and described in the embodiment of FIGURES 4 and 5, which fits into an aperture 116 defined in a brake shoe web 118. The inner end of the lever 110 carries a tubular bearing element 120 having a substantially hemispherical outer surface which pivotally engages the rear surface of the backing plate 112 adjacent the aperture 111. The bearing element 120 also has a plurality of inwardly curved fingers 122 which fit in a groove 124 in the end of the lever 110 to secure the element 120 thereto. The opposite end of the lever 110 has a pair of spaced flanges 126, 128 defining a groove which receives one end of a brake return spring 130 for retracting a brake shoe away from a rotatable brake drum. Brake shoe spring return forces are transmitted to the brake web 124 by means of the lever 110 and the retainer element 114 which coact in the same manner as their counterpart elements in the embodiment of FIGURES 4 and 5.

In the embodiment illustrated in FIGURES 6 and 7, a brake shoe is held in lateral alignment with a rotatable brake drum by means of a substantially conically shaped hold-down spring 132 which surrounds the lever 110. One end of the spring 132 engages the inner surface of the tubular retainer 114 and its opposite end engages the innermost flange 128 on the outer end of the lever 110, to urge the web 118 of a brake shoe away from the outer end 126 of the lever 110 to produce the desired lateral alignment.

Another embodiment of the invention is illustrated in FIGURE 8 as including a brake shoe return lever 140 which extends through an aperture 142 in a backing plate 144 and an aperture 146 in a brake shoe web 148. The inner end of the lever 140 is deformed to define a substantially hemispherical bearing surface 150 which pivotally engages the rear surface of the backing plate 144 adjacent the aperture 142 therein. The opposite end 152 of the lever 140 is operatively connected to a brake return spring 154 by means of a cup-shaped retainer 156 which has an outwardly directed edge portion 158 which engages one end of the brake return spring 154 and an inwardly directed tubular portion 159 which fits within the aperture 146 in the web 148. Spring forces from the brake return spring 154 are transmitted to the brake shoe web 148 through a spherical portion 160 defined in the outer surface of the lever 140 which pivotally engages the inner surface of the tubular portion 159 in the web. The spherical portion 160 prevents galling of the lever 140 as it is moved relative to the web 146 by the spring 154 and is thereby the counterpart of the inwardly curved surfaces on the tubular retainer elements in the previous embodiments.

In this embodiment a brake shoe is held in lateral alignment with a rotatable drum by means of a hold-down spring 162 which surrounds the outer end 152 of the lever 140. One end of spring 162 bears against the inner surface of the cup-shaped retainer 156 and its opposite end bears against washer 164 which is secured to the outer end 152 of the lever 140 at a point located outwardly of the retainer 156. The hold-down spring 162 will urge the brake shoe web 150 away from the washer 164 and thereby produce the desired lateral alignment between a brake shoe and a rotatable brake drum in a manner discussed in the previous embodiments.

Yet another embodiment of the invention is illustrated in FIGURE 9 as comprising a brake shoe return lever 165 which is directed through an aperture 166 in a backing plate 168 and a central opening defined in a tubular retainer 170 which snugly fits in an aperture 172 defined in a brake shoe web 174. The inner end of the lever 165 is deformed to define a substantially hemispherical bearing surface 176 which pivotally engages the rear surface of the backing plate 168. The opposite end 178 of the lever 165 is upset to define a shoulder spaced outwardly of the brake shoe web 174 which engages one end of a brake shoe return spring 180 for retracting a brake shoe away from a rotatable brake drum.

Spring forces from the brake shoe return spring 180 are transmitted to the brake shoe web 174 by means including a spherical portion 182 on the lever 165 which bears against the flat inner surface of an inwardly directed end 184 of the retainer 170 at a point offset inwardly of the centerline of the web 174 so that the spring return forces will tend to raise the brake shoes off supporting shelves on the backing plate as was discussed in the embodiment of FIGURES 1–3. The spherical portion 182 freely pivots on the flat inner surface of the retainer 180 to prevent galling of the lever 165.

In this embodiment the brake shoe is laterally located by means of a hold-down spring 186 which surrounds the lever 165 outwardly of the brake web 174. One end of the spring engages the inner surface of the retainer 170 at the outer end thereof. The opposite end of the spring 186 engages a cup-shaped washer 188 which surrounds the lever 165 inwardly of its upset outer end 178 where its outer surface engages the brake shoe return spring 180. The spring 186 will urge the brake web 174 away from the washer 188 at the outer end 178 of the lever 165 to produce a desired lateral relationship between the brake shoe and a rotatable brake drum.

Another embodiment of the improved brake shoe retracting and holding assembly is illustrated in FIGURES 10 and 11 as including an elongated brake shoe return lever 190 which is directed through an aperture 192 in a backing plate 194 and a central opening defined in a tubular retainer 196 which is identical to the retainer 170 in the embodiment of FIGURE 9. The retainer 196, therefore, includes an inner end 198 which snugly fits in an aperture 200 in a brake shoe web 202 of a shoe 203. The inner end of the lever 190 is deformed to define a substantially hemispherical bearing surface 205 which pivotally engages the rear surface of the backing plate 194. The opposite end 204 of the lever 190 is shaped as a flat surface which defines shoulder portions on the lever 190 located outwardly of the brake shoe web 202. The flat surface of the end 204 is bent over to engage one end of a brake shoe return spring 206 for retracting the shoe 203. Forces from the brake shoe return spring 206 are transmitted to the brake shoe web 202 by means of a bent portion in the lever 190 which defines a convexly curved bearing surface 208 which pivotally engages the flat inner surface of the inner end 198 of the tubular retainer 196. Such an arrangement prevents galling of the lever 190. The convexly curved surface 208 also engages the inner surface of the end 198 at a point offset inwardly from the center-line of the brake shoe web 202 so as to impose a force on the brake shoe 203 which tends to raise it away from supporting shelf portions on a backing plate as was previously discussed in the embodiment of FIGURES 1–3.

In this embodiment, the wear reducing pivotable engagement between the lever 190 and the tubular retainer 196 is maintained by the return spring 206 which engages the flat surface on the outer end 204 to partially resist rotation of the lever 190 relative to the retainer 196. Such relative rotation is further restricted by a washer 210 seated on the shoulders defined by the outer end 204 and a hold-down spring 212. The washer 210 is fixedly connected against rotation relative to the lever 190 by suitable means such as flat surfaces 214 on the lever 190 which snugly engage the sides of an aperture 216 in the washer 210. One end of the hold-down spring 212 engages the inner surface of the washer 210 and its opposite end engages the inner surface of the outer end of the retainer 196 to resiliently hold the washer 210 and the lever 190 against rotation relative to the retainer 196. The hold-down spring 212 acts to produce a desired lateral alignment of a brake shoe and a rotatable brake drum in the same manner as the hold-down spring 186 disclosed in the embodiment of FIGURE 9.

Still another embodiment of the improved brake shoe retracting and holding assembly is ilustrated in FIGURES 12 and 13, as including a brake shoe return lever 218 which has an inner end which defines a substantially hemispherical bearing surface 220 which pivotally engages the rear surface of a backing plate 222. The lever 218 extends outwardly through an aperture 224 in the backing plate 222 and thence through an aperture 226 in a brake shoe web 228 and terminates in an outwardly located end 230, which is spaced outwardly of the brake shoe web 228. The lever 218 includes a bent portion defining a convexly curved surface 232 which engages an inner surface defined by the aperture 226 for transmitting forces from a brake shoe return spring 234 to the brake shoe web 228 for moving a brake shoe 236 radially inwardly and outwardly with respect to a rotatable brake drum. The brake shoe return spring 234 is connected to the lever 218 by means of a cup-shaped washer 238 which has an outwardly directed peripheral edge 240 connected to the end of the brake shoe return spring 234 and a radially inwardly located tubular extension 242 which is secured on the portion of the lever 218 located between the brake shoe web 228 and the outer end 230 of the lever 218.

In this embodiment the convexly curved surface 232 of the lever 218 is held in alignment with the inner surface of the brake shoe web 228 by flat inner surfaces 244 in the cup-shaped washer 238. The flat surfaces 244 bear against the sides of the bent portion in the lever 218 to prevent rotation of the lever 218 relative to the cup-shaped washer 238 which is held against rotation by the return spring 234.

The brake shoe 236 is also held in lateral alignment with respect to a rotatable brake drum by means of a hold-down spring 248 which has an end engaging the inner surface of the cup-shaped washer 238 and an opposite end which engages a washer 246 staked on the outer end 230 of the lever 218. The spring 248 acts to align the brake shoe 236 in the same manner as the spring 186 disclosed in the embodiment of FIGURE 9.

The retainer or washer adjacent the brake web in each of the above described embodiments may include a recessed outer surface which is adapted to be operatively connected to a cable portion of an automatic brake adjuster system. It also should be understood that the various embodiments of the brake shoe retracting and holding assemblies are suited for use in all brake constructions of the internal expanding shoe type and are not limited to use in the type illustrated in FIGURES 1–3.

It will be understood that the specific constructions of the improved embodiments of brake shoe retracting and holding assemblies which are herein disclosed and described are presented for purposes of explanation, illustration, and are not intended to indicate limits of the invention, the scope of which is defined by the following claims.

What is claimed is:

1. A brake for use in cooperation with a rotatable brake drum comprising a backing plate, a brake shoe having a radially inwardly directed web portion, said web portion having an opening therethrough, force transmitting means operatively connected to said brake shoe for moving said brake shoe radially outwardly toward the brake drum, a lever directed through said opening in said web portion having one end pivotally supported at said backing plate, first spring means operatively connected to the opposite end of said lever for biasing said lever in a direction which will cause said web portion to move radially inwardly of the brake drum, and second spring means surrounding said lever at said opposite end thereof resiliently urging said brake shoe toward said backing plate.

2. A brake for use in cooperation with a rotatable brake drum comprising a backing plate having circumferentially spaced shelves, a brake shoe having a rim portion adapted to be supported by said shelves and a radially inwardly directed web portion, said web portion having an opening therethrough, force transmitting means operatively connected to said brake shoe for moving said brake shoe radially outwardly toward the brake drum, a lever directed through said opening in said web portion having one end pivotally supported at said backing plate, first spring means operatively connected to the opposite end of said lever for biasing said lever in a direction which will cause said web portion to move radially inwardly of the brake drum, and second spring means surrounding said lever at said opposite end thereof resiliently holding said brake shoe in engagement with said shelves on said backing plate.

3. A brake for use in cooperation with a rotatable brake drum comprising a backing plate, a brake shoe having a radially inwardly directed web portion, force transmitting means operatively connected to said brake shoe for moving said brake shoe radially outwardly toward the brake drum, said web portion having an opening therethrough, a lever directed through said opening having one of its ends pivotally supported at said backing plate, first spring means operatively connected to the opposite end of said lever for biasing said lever in a first direction, a cup-shaped retainer having a first portion thereof engaging said web portion adjacent the opening therein and having a second portion thereof engaging said lever spaced from said web portion for transmitting forces from said first spring means to said web portion which move said brake shoe radially inwardly of the brake drum and outwardly from the backing plate, and second spring means having one end engaging the inner surface of said cup-shaped retainer and the said opposite end of said lever for resiliently urging said brake shoe toward said backing plate.

4. A brake for use in cooperation with a rotatable brake drum comprising a backing plate, a brake shoe having a radially inwardly directed web portion with an expansible end and an articulated end, force transmitting means operatively connected to expansible end of said web portion for moving said brake shoe radially outwardly toward the brake drum, means defining an opening in the expansible end of said web portion, a lever extending through said opening having one of its ends pivotally supported at said backing plate, first spring means operatively connected to the opposite end of said lever for biasing said lever in a first direction, a cup-shaped retainer having a first portion thereof engaging said web portion adjacent the opening therein and having a second portion thereof engaging said lever for transmitting forces from said first spring means to said web portion which move said brake shoe radially inwardly of the brake drum, a brake shoe adjuster element operatively connected to said articulated end of said brake shoe, a cable having one end anchored to said backing plate and having an opposite end connected to said adjuster element, said cup-shaped retainer further including an outer surface portion which is engaged by said cable for operatively connecting said expansible end of said brake shoe to said adjuster element, and second spring means having one end engaging the inner surface of said cup-shaped retainer and the other end engaging an abutment on the adjacent end of said lever for resiliently urging said brake shoe toward said backing plate.

5. A brake for use in cooperation with a rotatable brake drum comprising a backing plate, a brake shoe having a radially inwardly directed web portion, force transmitting means operatively connected to said brake shoe for moving said brake shoe radially outwardly toward the brake drum, means defining an opening in said web portion, a retainer having a cup-shaped portion and a tubular portion which snugly fits within the opening in said web portion, a lever directed through said tubular portion of said retainer having one of its ends pivotally supported at said backing plate, first spring means operatively connected to the opposite end of said lever for biasing said lever in a first direction against the inner surface of said tubular portion of said retainer for transmitting spring forces to said web portion which move said brake shoe radially inwardly of the brake drum, said lever and the inner surface of said tubular inner portion having relatively curved bearing surfaces for reducing lever wear adjacent said web portion as said lever pivots on said backing plate, and second spring means having one end engaging the inner surface of said cup-shaped portion of said retainer and the other end engaging an abutment on the adjacent end of said lever for resiliently urging said brake shoe toward said backing plate.

6. A brake for use in cooperation with a rotatable brake drum comprising a backing plate having circumferentially spaced shelves, a brake shoe having a rim portion adapted to be supported by said shelves and a radially inwardly directed web portion, force transmitting means operatively connected to said brake shoe for moving said brake shoe radially outwardly toward the brake drum, a retainer having a tubular portion directed through said web portion, a lever directed through said tubular portion of said retainer having one of its ends pivotally supported at said backing plate, first spring means operatively connected to the opposite end of said lever for biasing said lever in a first direction against the inner surface of said tubular portion of said retainer at a point offset from the centerline of said web portion for transmitting forces from said first spring means to said web portion which tend to raise said rim portion of said brake shoe from said peripheral shelves on said backing plate, and second spring means surrounding said lever at said opposite end thereof resiliently urging said brake shoe toward said backing plate.

7. A brake for use in cooperation with a rotatable brake drum comprising a backing plate, a brake shoe having a radially inwardly directed web portion, force transmitting means operatively connected to said brake shoe for moving said brake shoe radially outwardly toward the brake drum, a retainer having a cup-shaped portion and a tubular portion directed through said web portion, a lever directed through said tubular portion of said retainer having one of its ends pivotally supported at said backing plate, first spring means operatively connected to the opposite end of said lever for biasing said lever in a first direction against the inner surface of said tubular portion of said retainer for transmitting forces from said first spring means to said web portion which move said brake shoe radially inwardly of the brake drum, said inner surface of said tubular portion defining a convexly curved bearing surface which engages said lever to reduce lever wear adjacent said web portion as said lever pivots on said backing plate, and second spring means having one end engaging the inner surface of said cup-shaped portion of said retainer and the other end engaging an abutment on the adjacent end of said lever for resiliently urging said brake shoe toward said backing plate.

8. A brake for use in cooperation with a rotatable brake drum comprising a backing plate, a brake shoe having a radially inwardly directed web portion, force transmitting means operatively connected to said brake shoe for moving said brake shoe radially outwardly toward the brake drum, a retainer having a cup-shaped portion and a tubular portion directed through said web portion, a lever directed through said tubular portion of said retainer having one of its ends pivotally supported at said backing plate, first spring means operatively connected to the opposite end of said lever for biasing said lever in a first direction against the inner surface of said tubular portion of said retainer for transmitting forces from said first spring means to said web portion which move said brake shoe radially inwardly of the brake drum, said lever including a spherical bearing surface which engages the inner surface of said tubular portion to reduce lever wear adjacent said web portion as said lever pivots on said backing plate, and second spring means having one end engaging the inner surface of said cup-shaped portion of said retainer and the other end engaging an abutment on the adjacent end of said lever for resiliently urging said brake shoe toward said backing plate.

9. A brake for use in cooperation with a rotatable brake drum comprising a backing plate, a brake shoe having a radially inwardly directed web portion, force transmitting means operatively connected to said brake shoe for moving said brake shoe radially outwardly toward the brake drum, a retainer having a cup-shaped portion and a tubular portion directed through said web portion, a lever directed through said tubular portion of said retainer having one of its ends pivotally supported at said backing plate, first spring means operatively connected to the opposite end of said lever for biasing said lever in a first direction against the inner surface of said tubular portion of said retainer for transmitting forces from said first spring means to said web portion which move said brake shoe radially inwardly of the brake drum, said lever having a bent portion defining a convexly curved surface which engages the inner surface of said tubular portion to reduce lever wear adjacent said web portion as said lever pivots on said backing plate, means including said first spring means preventing rotation of said lever relative to said tubular portion of said retainer, and second spring means having an end engaging the inner surface of said cup-shaped portion of said retainer and the other end engaging an abutment on the adjacent end of said lever for resiliently urging said brake shoe toward said backing plate.

10. A brake for use in cooperation with a rotatable brake drum comprising a backing plate, a brake shoe having a radially inwardly directed web portion, force transmitting means operatively connected to said brake shoe for moving said brake shoe radially outwardly toward the brake drum, means defining an aperture in said web portion, a retainer having a tubular portion and a cup-shaped portion surrounding said tubular portion, a lever directed through the aperture in said web portion and said tubular portion of said retainer having one of its ends pivotally supported at said backing plate, said lever having a bent portion defining a convexly curved surface which engages said web portion, first spring means connected to said cup-shaped portion of said retainer for biasing said retainer in a first direction relative to said web portion for retracting said brake shoe, said tubular portion of said retainer and said lever including coacting means which prevent rotation of said lever relative to said web portion, and second spring means having one end engaging the inner surface of said cup-shaped portion of said retainer and the other end engaging an abutment on the adjacent end of said lever for resiliently urging said brake shoe toward said backing plate.

11. A brake comprising a brake shoe having a web portion and an expansible end and an articulated end, a rotatable brake drum, a backing plate, means for moving the expansible end of said brake shoe into engagement with said brake drum, said web being provided with an opening adjacent its expansible end, a lever extending through said opening and having one end pivotally supported on said backing plate, a first spring operatively connected to the opposite end of said lever for biasing said lever in a direction to cause said brake shoe to move radially inwardly of the brake drum, a retainer having a first portion engaging the opening in said web portion and having a second portion engaging said lever for transmitting forces from said first spring to said web portion to move said brake shoe radially inwardly of the brake drum, an adjusting member operatively connected to said articulated end of the brake shoe, a cable member having one end anchored on said backing plate and having its other end connected to said adjusting member, a surface portion on said retainer which is engaged by said cable member for operatively connecting the adjustable end of said brake shoe to said adjusting member, and a second spring having one end engaging said retainer and the other end engaging an abutment on the adjacent end of said lever for resiliently urging said brake shoe toward said backing plate.

References Cited
UNITED STATES PATENTS

| | | | |
|---|---|---|---|
| 2,095,753 | 10/1937 | La Brie | 188—78 X |
| 2,251,854 | 8/1941 | Parnell et al. | 188—216 X |
| 2,978,072 | 4/1961 | Burnett | 188—79.5 |
| 3,003,591 | 10/1961 | Rike | 188—78 |
| 3,061,051 | 10/1962 | Swift | 188—78 |

FOREIGN PATENTS 583,785 10/1958 Italy.

DUANE A. REGER, *Primary Examiner.*